UNITED STATES PATENT OFFICE.

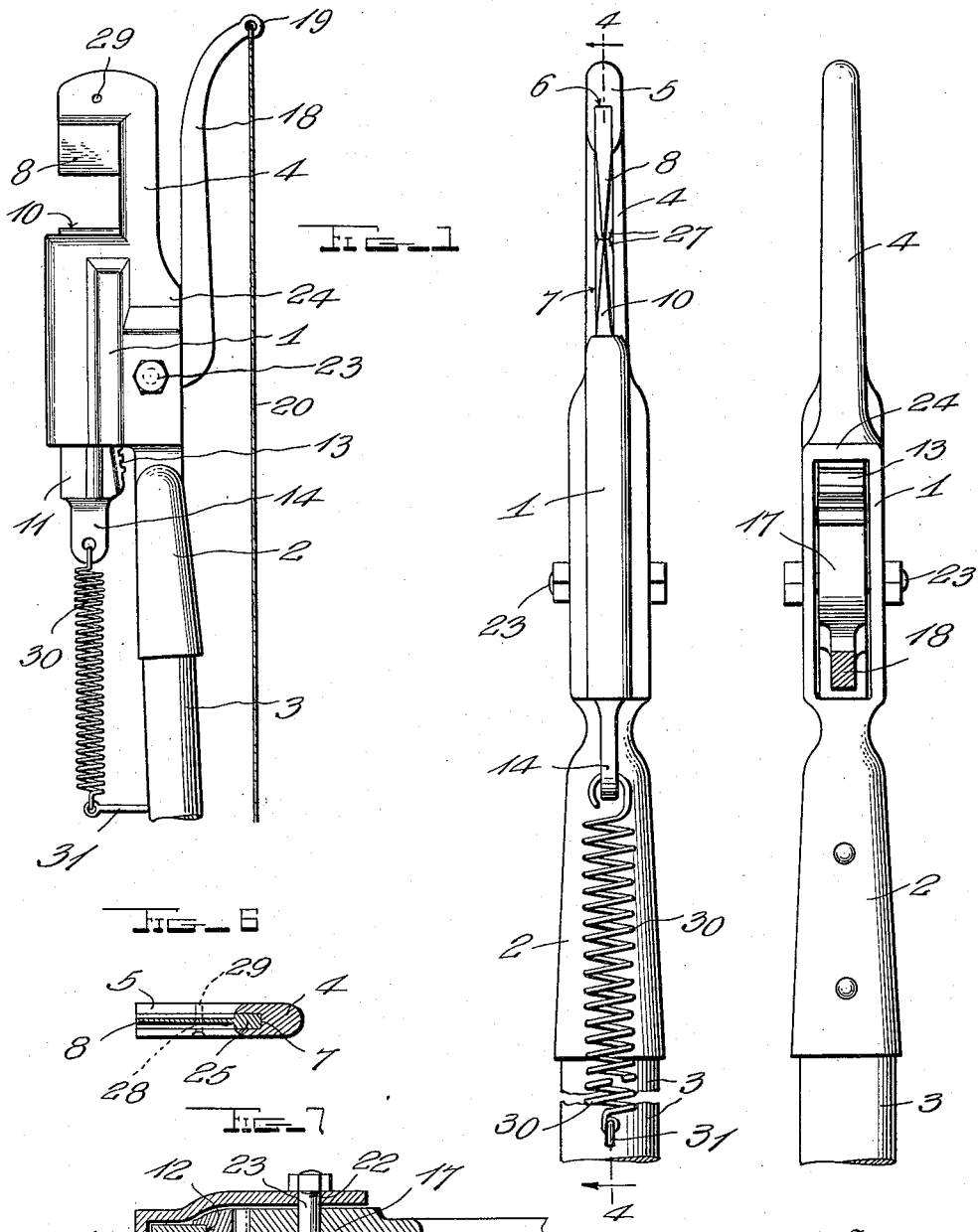

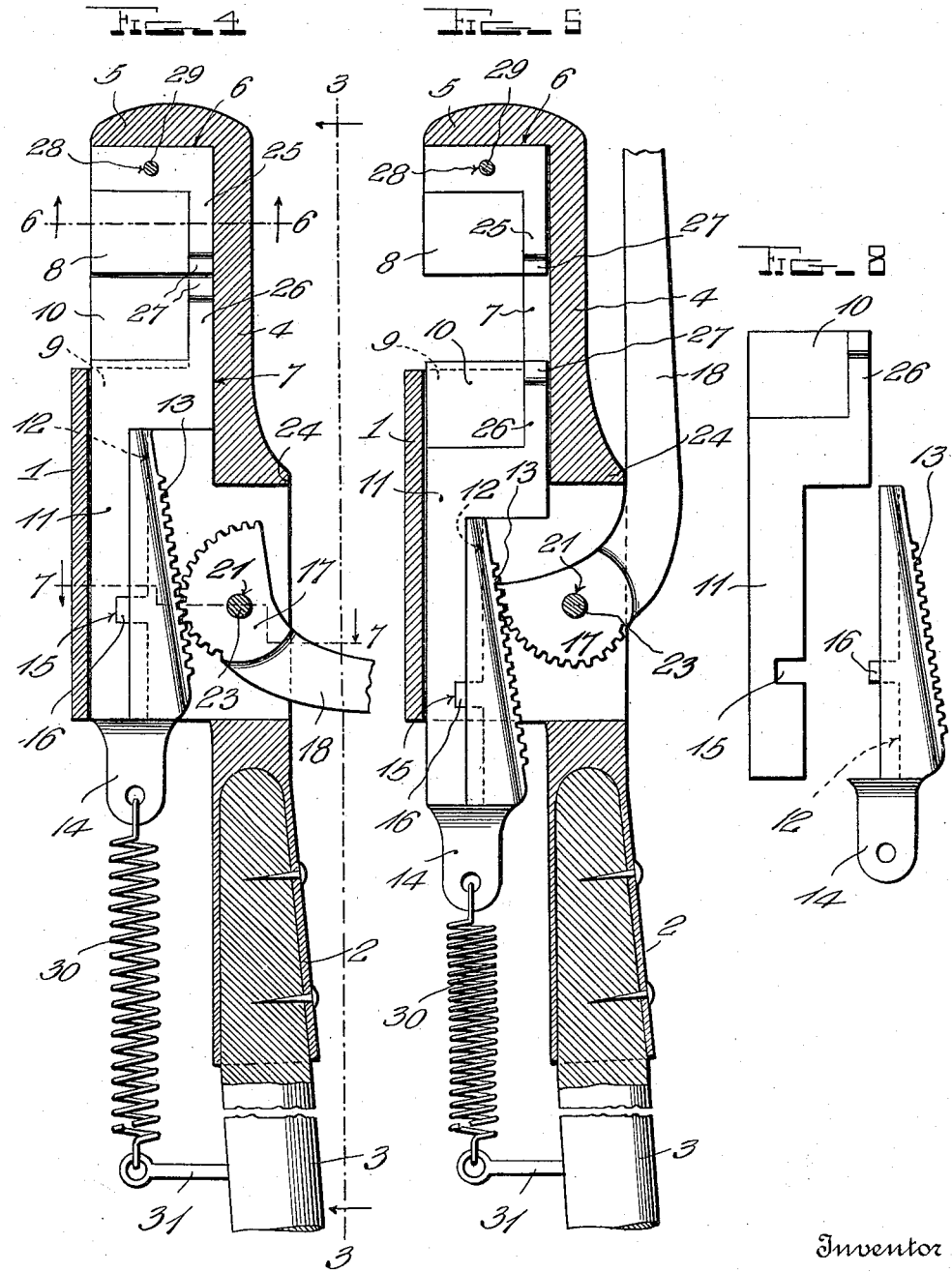

EMERSON McKENNEY, OF BANGOR, MAINE.

PRUNING-SHEARS.

1,173,527.  Specification of Letters Patent.  Patented Feb. 29, 1916.

Application filed September 23, 1915. Serial No. 52,207.

*To all whom it may concern:*

Be it known that I, EMERSON MCKENNEY, a citizen of the United States, residing at Bangor, in the county of Penobscot and State of Maine, have invented certain new and useful Improvements in Pruning-Shears; and I do declare the following to be a full, clear, and exact description of the invention, such as will enable others skilled in the art to which it appertains to make and use the same.

This invention relates to improvements in pruning shears, particularly that class in which the movable cutting blade is operated by a rack and pinion, and has for its object to provide a comparatively simple device of this character which will readily and effectively accomplish the purposes for which it is designed.
Another object of my invention is to provide pruning shears provided with removable cutting blades.

Still another object is to provide a device of this character whose cutting blades have stops formed thereon for limiting the movement of one toward the other so as to prevent dulling of the cutting edges of the said blades by coming in violent contact with one another.
Still a further object of my invention is to provide pruning shears whose movable cutting blade is readily removable from the rack bar of the device.

With these and other objects in view my invention resides in the novel features of construction, combination and arrangement of parts as will be hereinafter more particularly described and claimed.

In the accompanying drawings: Figure 1 represents a side elevation of a pair of pruning shears embodying my improved features of construction; Fig. 2 is a front edge view thereof, with the cutting blades arranged in contact with one another; Fig. 3 is a vertical section on line 3—3 of Fig. 4; Fig. 4 is a central vertical longitudinal section on line 4—4 of Fig. 2; Fig. 5 is a similar view but showing the cutting blades spaced apart; Figs. 6 and 7 are horizontal sectional views on the lines 6—6 and 7—7 of Fig. 4; Fig. 8 is a side elevation of the movable cutting blade and the rack arranged in juxtaposition.

Referring to the drawings wherein simi-
lar reference characters designate corresponding parts throughout the several views, 1 indicates broadly a housing adapted to inclose the movable cutting blade and the operating mechanism therefor.

Formed integrally with one end of this housing 1 is a tubular shank 2 adapted to be secured to the end of a suitable handle or pole 3, while from the opposite end of said housing 1 a shank 4 projects, said shank having its free end extended laterally to provide an arm 5. This arm 5 is provided on its lower edge with a groove 6 which merges with a similar groove 7 formed in the adjacent edge of said shank 4, said grooves being adapted to receive the edges of a removable stationary cutting blade 8.

The groove 7 merges into a suitable guide passage 9 formed through the housing 1 at its forward portion, said passage being adapted to receive a movable cutting blade
10. This movable cutting blade 10 is provided with a shank 11 formed on its lower edge which is adapted to be inserted in a groove 12 formed in one edge of a rack bar 13, said rack bar having formed integrally with its lower end an ear 14 for a purpose to appear. The rack bar 13 is preferably though not necessarily tapered from its lower toward its outer end, thus causing the toothed edge thereof to be inclined. The gear sector 17 adapted for coaction in the said rack bar is also of a peculiar shape from its pivot to the teeth and meshes with the rack teeth as the sector is moved to the right about its pivot. This arrangement has the effect of giving the device a greater leverage and cutting power as the blades enter the limb which is being severed. The shank 11 of this cutting blade 10 is provided with a notch 15 which is adapted to coact with a stop 16 formed in said groove 12. When these two parts of the device are assembled, as shown in Fig. 5 of the drawings, with the stop 16 in the slot 15, any longitudinal movement of the parts relative to one another will be prevented. Lateral movement thereof is also prevented by the gear sector 17 which coacts with the rack 13 and holds the aforesaid parts in contact with the front wall of the guide passage 9. This gear sector 17 is formed integrally with one end of an operating arm 18, while at the other end of said arm is formed an eye 19 in which a suitable operating cable 20 is adapted to be placed. The member 17 is formed with a pivot hole 21 through its center which is adapted to aline with similar holes 22 formed in the walls of the housing 1, and receive therethrough a pivot pin 23. When in normal position, the operating arm 18 is positioned as shown in Fig. 1, with its forward edge abutting a stop 24 formed on the edge of the housing member 1, but when this arm is moved downwardly this movement will be imparted to the gear and rack to raise the movable cutting blade into the position shown in Figs. 2 and 4.

Both the stationary cutting blades 8 and the movable blades 10 are provided along one edge with a thickened portion 25 and 26 respectively, which is adapted to be received in the groove 7 formed in the shank 4. The inner ends of these thickened portions are squared to provide stop members 27 which are adapted to abut when the cutting blades are moved into operative position. By providing this stop means the cutting edges of the blades will be prevented from coming into violent contact with one another and dulling the same.

The stationary cutting blade is formed with a hole 28 through its upper portion for alinement with the holes formed in the arm 5 and is adapted to receive therethrough a screw 29 for holding it in rigid position in the grooves 6 and 7.

The aforesaid ear 14 formed on the rack bar 13 is adapted to receive one end of a spring 30 whose opposite end is secured to the eye 31 so as to normally hold the cutting blades in spaced relation to one another. It will thus be seen that this spring will always move the cutting blades apart when the cable secured to the operating arm 18 is released.

By providing removable cutting blades, said blades may be conveniently sharpened at any time or replaced, when worn out, by new blades. Particular emphasis is laid on the stop members provided on these cutting blades as well as the means for securing the removable blades in operative position in the device.

From the foregoing description of the construction of my improved pruning shears, the manner of applying the same to use and the advantages thereof will be readily understood, and it will be seen that I have provided a simple and inexpensive, yet efficient device of this character for carrying out the objects of the invention.

While I have particularly described the elements best adapted to perform the functions allotted to them, it is obvious that various changes in form, proportion, and in the minor details of construction may be resorted to within the scope of the appended claims without departing from the spirit or sacrificing any of the principles of the invention.

Having described my invention, what I claim is:—

1. In a pruning device, a housing having a longitudinal guide passage, a handle at one end of said housing, a shank extending from the other end, a stationary blade carried by said shank, a movable blade carrying member slidable in said guide passage, a blade on said member for coaction with the stationary blade, a rack bar contacting with said member, means for preventing longitudinal shifting of said rack relative to said member, a gear sector for coaction with the rack, said sector holding said rack bar and said member in coöperative engagement, whereby the latter is raised or lowered upon movement of the former, and means for operating said gear sector.

2. In a pruning device, a housing having a longitudinal guide passage, a handle at one end of said housing, a shank extending from the other end, a stationary blade carried by said shank, a movable blade slidable in said guide passage, and coacting with the stationary blade, a shank extending from said movable blade within the guide passage, a rack bar having a groove in one of its longitudinal edges receiving one longitudinal edge of the shank, means for preventing longitudinal shifting of said rack relative to said member, a gear sector for coaction with the rack, said sector holding said rack bar and said shank in coöperative engagement, whereby the latter with its blade is raised or lowered upon movement of the former, and means for operating said gear sector.

3. In a pruning device, a housing having a longitudinal guide passage, a handle at one end of said housing, a shank extending from the other end, a stationary blade carried by said shank, a movable blade carrying member slidable in said guide passage, and having a notch in one of its edges, a blade on said member for coaction with the stationary member, a rack bar contacting with said member, a stop carried by the bar for engagement with said notch to prevent longitudinal shifting of the parts, a gear sector for coaction with the rack, said sector holding said rack and said member against lateral movement, whereby the latter is raised or lowered upon movement of the former, and means for operating said sector.

4. In a pruning device, a housing having a longitudinal guide passage, a handle at one end of said housing, a shank extending from the other end, a stationary blade carried by said shank, a movable blade slidable in said guide passage and coacting with the stationary blade, a shank extending therefrom within the guide passage and having a notch in one of its edges, a rack bar having a groove in one of its longitudinal edges receiving one longitudinal edge of the shank, a stop within said groove engaging said notch to prevent longitudinal shifting of the members, a gear sector for coaction with the rack, said sector holding said rack bar and shank against lateral shifting, whereby the latter with its blade is raised or lowered upon movement of the former, and means for operating said sector.

In testimony whereof I have hereunto set my hand in presence of two subscribing witnesses.

EMERSON McKENNEY.

Witnesses:
 HENRY W. MAYS,
 J. G. O'CONNOR.